(12) United States Patent
Ionel et al.

(10) Patent No.: US 7,669,311 B2
(45) Date of Patent: Mar. 2, 2010

(54) METHOD OF MANUFACTURING A CORE FOR AN ELECTRICAL MACHINE

(75) Inventors: Dan M. Ionel, Fox Point, WI (US); Brian Branecky, Oconomowoc, WI (US); Alan E. Lesak, Franklin, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 676 days.

(21) Appl. No.: 11/151,467

(22) Filed: Jun. 13, 2005

(65) Prior Publication Data

US 2005/0223541 A1 Oct. 13, 2005

Related U.S. Application Data

(62) Division of application No. 10/696,132, filed on Oct. 29, 2003, now Pat. No. 6,975,049.

(51) Int. Cl.
*H02K 15/00* (2006.01)

(52) U.S. Cl. .............. 29/596; 29/598; 29/606; 29/609; 310/172; 310/216.001

(58) Field of Classification Search ............. 29/596, 29/598, 606, 609; 310/172, 216, 258, 259, 310/216.001; 366/273, 274
See application file for complete search history.

(56) References Cited

U.S. PATENT DOCUMENTS

| | | | |
|---|---|---|---|
| 1,934,981 A | 11/1933 | Johnson | |
| 2,454,609 A * | 11/1948 | Miller | ............. 83/32 |
| 3,390,289 A | 6/1968 | Dijken et al. | |
| 3,440,460 A | 4/1969 | Postema | |
| 3,443,137 A | 5/1969 | McElroy | |
| 3,694,903 A | 10/1972 | Deming | |
| 3,742,269 A | 6/1973 | Holper et al. | |
| 3,813,763 A | 6/1974 | Church | |

(Continued)

FOREIGN PATENT DOCUMENTS

DE 3402036 7/1985

(Continued)

OTHER PUBLICATIONS

Photographs of the Emerson Plaset motor; Oct. 8, 2002, 1 page.

*Primary Examiner*—Thiem Phan
(74) *Attorney, Agent, or Firm*—Michael Best & Friedrich LLP (57) ABSTRACT

A method of manufacturing a core for an electrical machine. The method includes providing a planar sheet of magnetic material and creating first and second generally U-shaped laminations from the planar sheet. The first and second generally U-shaped laminations result from a pattern formed in the planar sheet. The pattern includes the first generally U-shaped lamination having a first leg and a second leg, and the second generally U-shaped lamination rotated one hundred-eighty degrees with respect to the first generally U-shaped lamination. The second generally U-shaped lamination includes a third leg and a fourth leg. The third leg is disposed between the first and second legs. The method further includes creating the core by stacking the first and second generally U-shaped laminations.

12 Claims, 9 Drawing Sheets

U.S. PATENT DOCUMENTS

| | | |
|---|---|---|
| 3,963,949 A | 6/1976 | Church |
| 3,983,621 A | 10/1976 | Donahoo |
| 4,095,161 A | 6/1978 | Heine et al. |
| 4,267,472 A | 5/1981 | Sudler et al. |
| 4,336,471 A | 6/1982 | Plancon |
| 4,473,766 A | 9/1984 | Obergfell et al. |
| 4,563,604 A | 1/1986 | Xuan |
| 4,600,864 A | 7/1986 | Sato |
| 4,691,132 A | 9/1987 | Bertram et al. |
| 4,711,019 A * | 12/1987 | Albeck et al. ............... 29/609 |
| 4,855,629 A | 8/1989 | Sato |
| 5,118,977 A | 6/1992 | Bertram et al. |
| 5,176,946 A | 1/1993 | Wieloch |
| 5,502,359 A * | 3/1996 | Schemmann et al. .. 310/40 MM |
| 5,619,086 A | 4/1997 | Steiner |
| 5,627,424 A * | 5/1997 | Steiner ..................... 310/258 |
| 5,627,804 A * | 5/1997 | Ishii ........................ 369/13.17 |
| 5,659,218 A | 8/1997 | Kliman et al. |
| 5,701,047 A | 12/1997 | Johnson |
| 5,708,406 A | 1/1998 | Tsunoda et al. |
| 5,767,606 A | 6/1998 | Bresolin |
| 5,780,951 A | 7/1998 | Stephens |
| 5,952,754 A | 9/1999 | Mok |
| 6,012,217 A | 1/2000 | Kliman et al. |
| 6,069,428 A | 5/2000 | Nelson |
| 6,630,766 B1 | 10/2003 | Kim et al. |
| 6,741,005 B2 | 5/2004 | Vohlgemuth |
| 6,777,852 B2 | 8/2004 | Ishikawa et al. |
| 2005/0067912 A1 | 3/2005 | Murakami et al. |

FOREIGN PATENT DOCUMENTS

| | | |
|---|---|---|
| EP | 0001334 | 4/1979 |
| EP | 0580131 | 3/1994 |
| GB | 212263 | 12/1924 |
| GB | 389570 | 3/1933 |
| GB | 1015044 | 12/1954 |
| GB | 730196 | 5/1955 |
| GB | 2010593 | 6/1979 |
| GB | 2268433 | 1/1994 |

* cited by examiner

METHOD OF MANUFACTURING A CORE FOR AN ELECTRICAL MACHINE

RELATED APPLICATIONS

This application is a divisional patent application of U.S. patent application Ser. No. 10/696,132, filed on Oct. 29, 2003, now U.S. Pat. No. 6,975,049 titled ELECTRICAL MACHINE AND METHOD OF MANUFACTURING THE SAME, the entire content of which is incorporated herein by reference.

BACKGROUND

The invention relates to an electrical machine and particularly an electrical machine with a generally U-shaped stator core.

Electrical machines with a U-shaped stator core are desirable for their simple construction and ease of manufacture. However, the large spaces of air between the two sides of a conventional U-shaped magnetic circuit result in large variations in air-gap permeance and cause cogging and ripple torque, noise, and vibration. Also, because of the specific configuration of the stator magnetic circuit, it is typically desirable to minimize the steel scrap and make best use of the materials. It is even more desirable to minimize the steel scrap in a brushless permanent magnet (BLPM) electrical machine where the rotor contains little or no steel. There is a demand for an electrical machine that minimizes the effect of cogging and ripple torque, noise, and vibration. There is also a demand to minimize the steel scrap for a U-shaped stator core. Also there is a demand for an electrical machine with a U-shaped core and a robust construction with only a reduced number of components.

SUMMARY

Accordingly, the invention provides an electrical machine including a rotor and a stator. The stator includes a core and at least one coil disposed on the core. The core comprises magnetic material and has a first leg, a second leg, and a base portion. The first and second legs include first and second surfaces, respectively. In one construction the first surface includes a first slot and the second surface includes a second slot. The electrical machine also includes a bridge comprising magnetic material. The bridge is inserted in the first and second slots.

The invention also provides a method of manufacturing a core for an electrical machine. The method includes the acts of providing a planar sheet of magnetic material (e.g., electrical steel), creating first and second generally U-shaped laminations from the planar sheet, and stacking the first and second generally U-shaped laminations. The first and second generally U-shaped laminations result from a pattern formed in the planar sheet of magnetic material. The pattern includes the first generally U-shaped lamination having a first leg and a second leg, and the second generally U-shaped lamination having a third leg and a fourth leg. The second generally U-shaped lamination is rotated one hundred-eighty degrees with respect to the first generally U-shaped lamination, and the third leg is disposed between the first and second legs.

Other features and aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" and variations thereof herein are used broadly and unless otherwise stated, encompass both direct and indirect connections, couplings, and mountings. In addition, the terms connected and coupled and variations thereof herein are not restricted to physical and mechanical connections or couplings.

Figure 1:
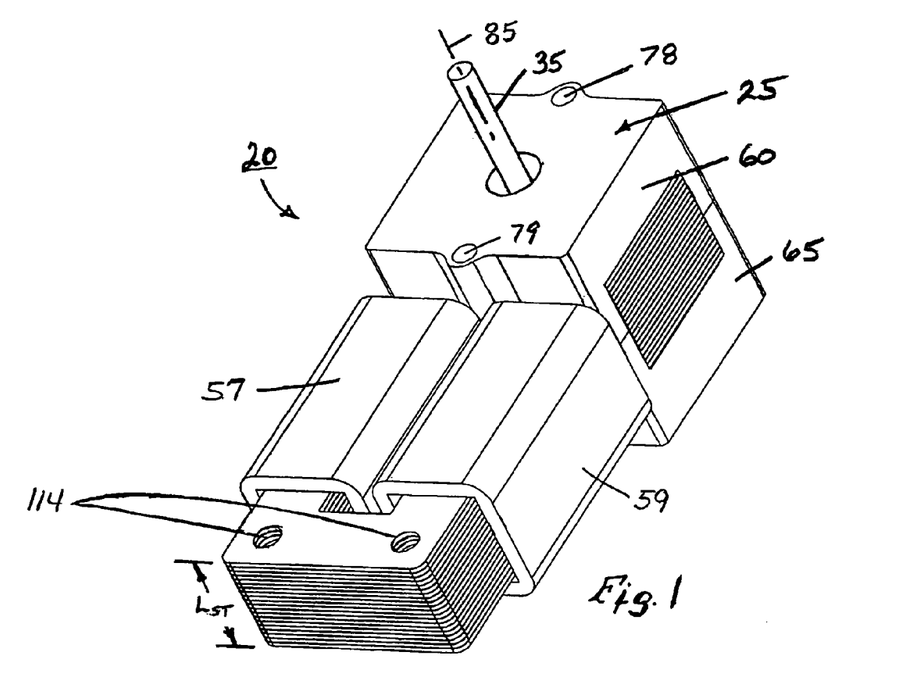
FIG. 1 is a perspective view of one construction of an electrical machine with a generally U-shaped stator core.
Figure 2:
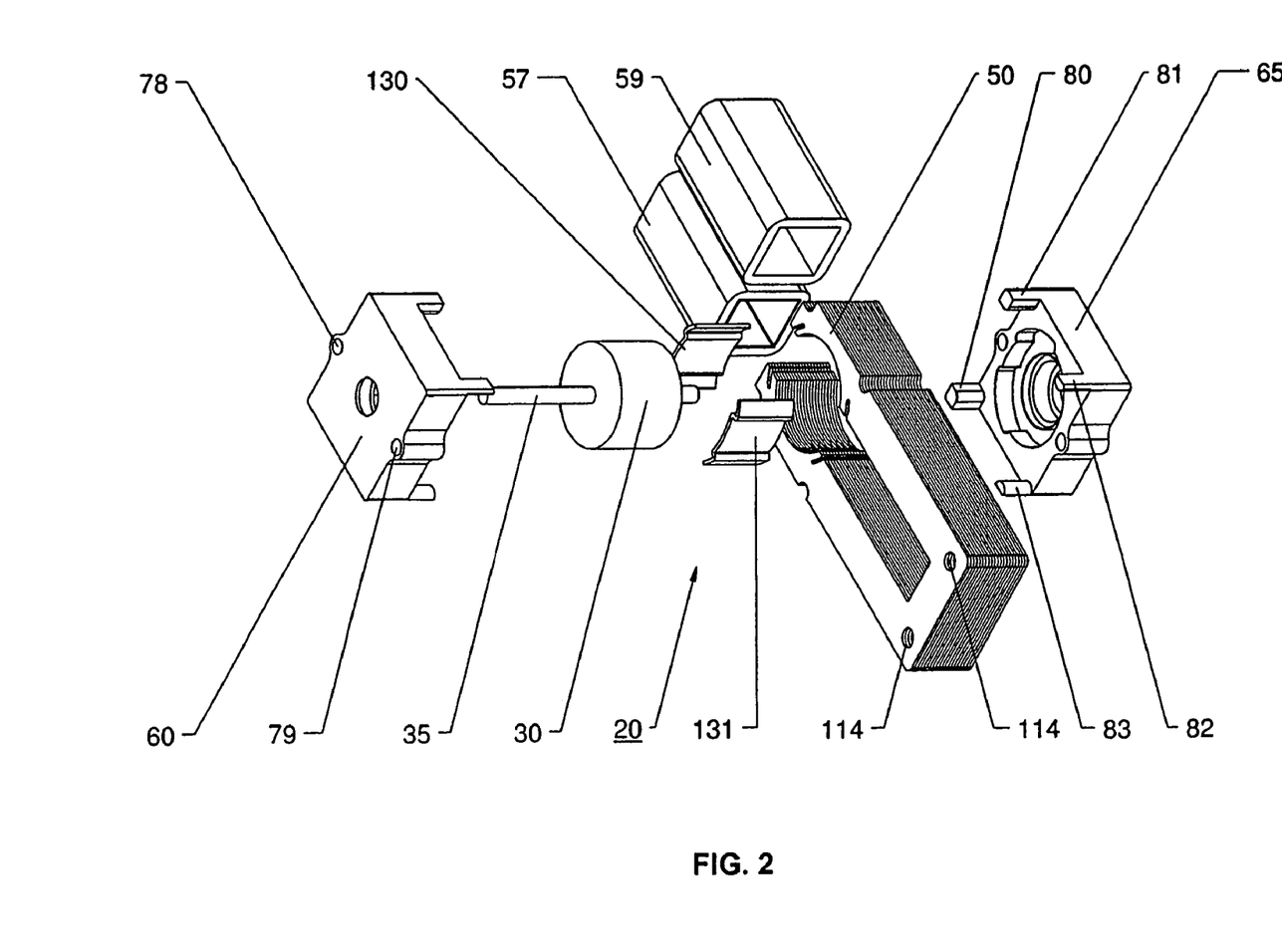
FIG. 2 is an exploded view of the electrical machine of FIG. 1.

FIG. 1 shows a perspective view and FIG. 2 shows an exploded view of a construction of an electrical machine incorporating some of the aspects of the invention. The construction shown in FIGS. 1 and 2 relates to a single-phase, two-pole, brushless permanent magnet (BLPM) electrical machine. The machine, which is shown as motor 20, includes housing 25, with a first and second endcaps 60 and 65, a rotor 30 containing permanent magnet material and coupled with a shaft 35, and a stator, which includes a core 50 and two coils 57 and 59. At least one coil is required for motor construction (see, e.g., coil 55 in FIGS. 3 and 4). The housing 25 has two openings 78 and 79 that receive a fastener (e.g., bolt, screw, rivet) coupling the first and second endcaps 60 and 65. The type of electrical machine can vary.

Figure 3:
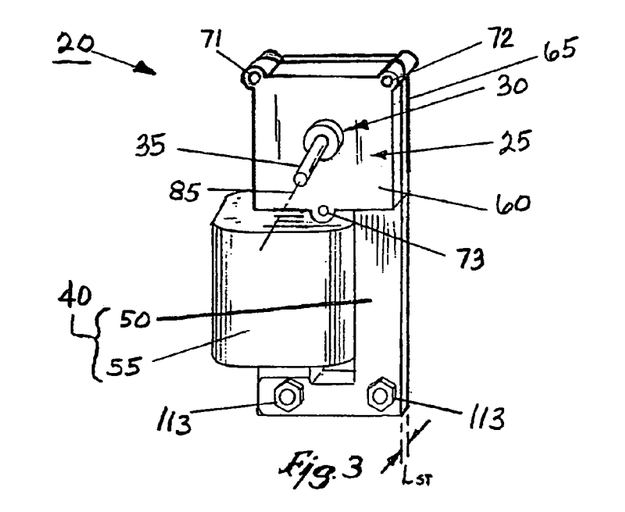
FIG. 3 is a perspective view of another construction of an electrical machine with a generally U-shaped stator core.
Figure 4:
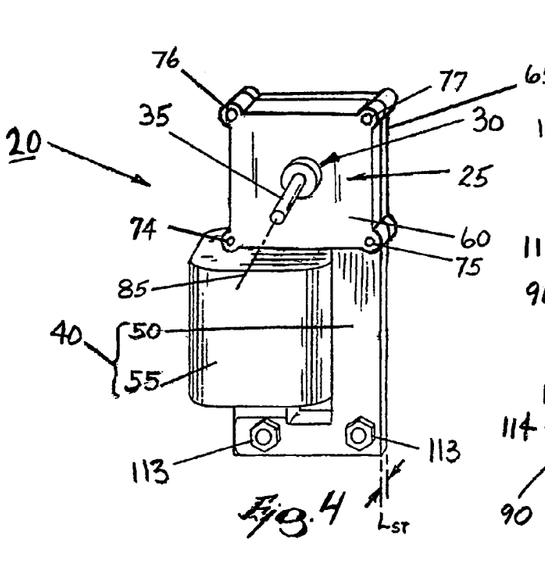
FIG. 4 is a perspective view of yet another construction of an electrical machine with a generally U-shaped stator core.

FIGS. 3 and 4 show other various constructions of the housing 25 for the motor 20. The housing 25 is generally square-shaped and houses, among other things, the rotor 30. Yet, the shape (e.g., circular, polygonal, etc.) and composition (e.g., plastic, steel, aluminum, etc.) of the housing 25 can vary. The housing 25 includes a first endcap 60 coupled to a second endcap 65 by a fastener. Other constructions of the housing 25 can include an intermediate portion disposed between the first 60 and second 65 endcaps. FIG. 3 shows one construction of the housing 25 having three openings 71, 72, and 73 that receive a fastener (e.g., bolt, screw, rivet) coupling the first and second endcaps 60 and 65. Openings 71 and 72 are disposed at two of the corners of the housing 25, and the third opening 73 is centrally disposed along the end surface of the housing 25 opposite the first 71 and second 72 openings. FIG. 4 shows another construction of the housing 25 having four openings 74, 75, 76, and 77 disposed at each corner of the housing 25. The type (e.g., bolts, nuts, adhesives, screws, rivets, spot-weld, etc.) of fastener used for fastening the first and second endcaps 60 and 65 can vary. In addition, the number of fasteners can vary. The housing 25 shown in FIGS. 1-4 can also include an encapsulating material (e.g., epoxy, injection molded plastic, etc.) to provide additional support of the housing 25 and core 50.

Figure 5:
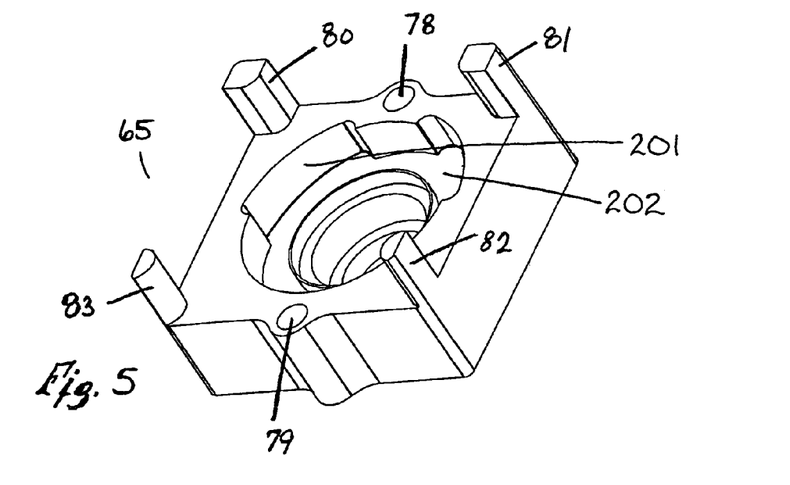
FIG. 5 is a perspective view of an endcap of the electrical machine of FIG. 1.

FIG. 5 shows a perspective view of the construction of the second endcap 65 of the housing 25 in FIG. 1. FIG. 5 shows the second endcap 65 having tabs 80, 81, 82, and 83 that insert in recesses (discussed later with respect to FIG. 6) of the core 50. The tabs 80, 81, 82, and 83 enhance support of the housing 25 and the core 50, thereby reducing vibration and noise of the motor 20.

One construction of the motor 20 is voltage controlled and relies on the back electromotive force (emf) to regulate the motor speed. For this construction, the motor 20 receives electrical power from a voltage source. The application of an electric voltage to the at least one coil 55 produces a current, which establishes an armature reaction magnetic field in the air-gap that separates the core 50 and the rotor 30. The armature reaction field interacts with the permanent magnet rotor magnetization to produce a rotational torque and cause rotor movement. The values of the applied voltage and of the back emf influence the values of the coil current, armature field and torque produced at the motor shaft. A control circuit regulates the flow of electrical power delivered to the at least one coil 55. One construction of the control circuit includes a Hall sensor operable to provide a signal representative of the position of the rotor 30. The Hall sensor provides the rotor position signal to the control circuit to determine the polarity of the voltage applied to the coil 55. The voltage polarity determines the direction of electrical current through the coil 55 and the polarity of the armature reaction magnetic field in the motor air-gap. However, the type of power source and/or voltage waveforms and/or current waveform and/or control method can vary.

FIG. 5 shows recesses 201 and 202 into the end-cap 65. These recesses provide a magnetically and mechanically convenient location for Hall devices. The type of end-cap and recesses for Hall devices can vary (see for example FIG. 19, which shows recesses 203 and 204).

FIG. 2 shows a first coil 57 and a second coil 59 wrapped around separate portions of the core 50. The first coil 57 and the second coil 59 are each connected to the power supply such as to produce in the motor air gap an armature magnetic field of the same polarity. The insulation, material, wire gauge, number of strands in hand used for the coils can vary.

Figure 6:
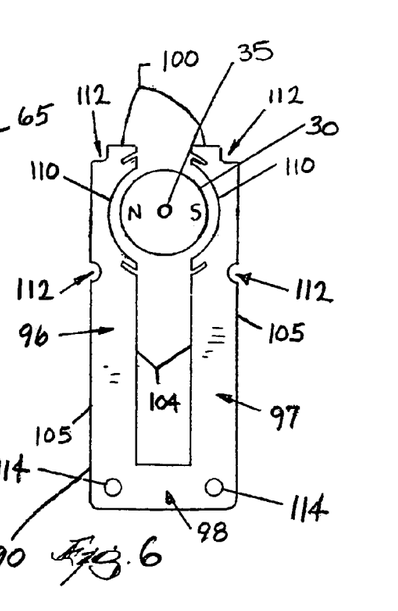
FIG. 6 is a cross-sectional view of one construction of a rotor and a lamination of the stator core used in the electrical machine of FIG. 1.

FIGS. 3 and 4 show the motor 20 having a single stator coil 55 disposed on the core 50. FIG. 6 shows a cross-sectional view of the rotor 30 disposed in a lamination 90 of the core 50. The rotor 30 is separated from the core 50 by an air gap. The rotor 30 includes a permanent magnet having a pair of magnetic poles (north (N) and south (S)) of opposite polarity. The shaft 35 is coupled to the rotor and rotates about a rotational axis 85 (see FIGS. 3 and 4) of the rotor 30.

FIGS. 1, 3, and 4 show the stator core 50 having a stack length ($L_{ST}$). The stack length ($L_{ST}$) can vary. One construction of the core 50 includes a plurality or stack of laminations 90 comprising electrical steel. Different types of electrical steel or other magnetic materials can also be used. Other constructions of the stator core 50 can include a single block of magnetic material or a core of compressed powdered magnetic material.

FIG. 6 shows a cross-sectional view of one construction of a generally U-shaped lamination 90. The lamination 90 includes a first leg 96 and a second leg 97. The first and second legs are connected by a base portion 98. Each leg 96 and 97 includes a free end 100, an inner surface 104, and an outer surface 105. Each inner surface 104 includes a recess 110 having an arcuate, or curvilinear, shape to receive the rotor 30. The shape of the recess 110 can vary (e.g., circular, tapered etc). Additionally, other lamination shapes (e.g., a substantially C-shaped lamination) can be used.

Figure 21A:
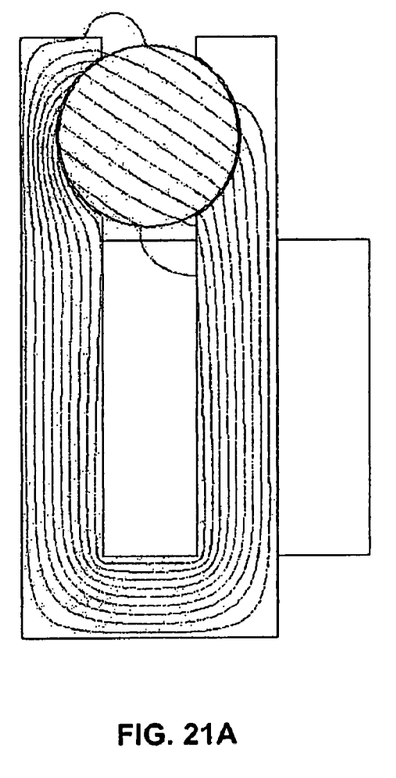
FIGS. 21A, 21B, and 21C are a cross-section of a brushless permanent magnet electrical machine with a generally U-shaped stator core at three different time instants during motor operation, the cross-section including the magnetic flux lines in the machine.
Figure 21B:
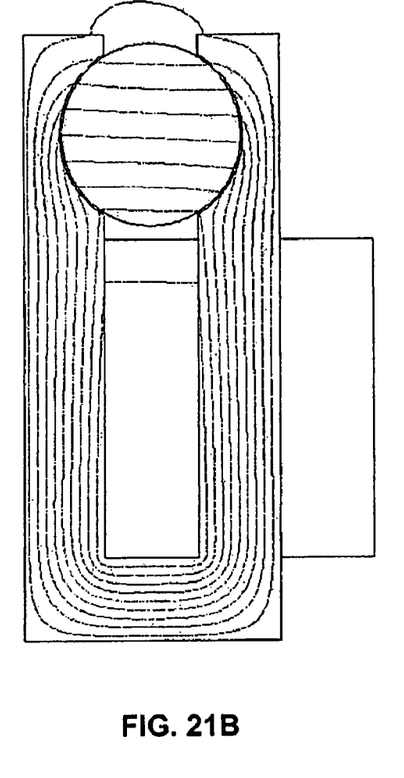
Figure 21C:
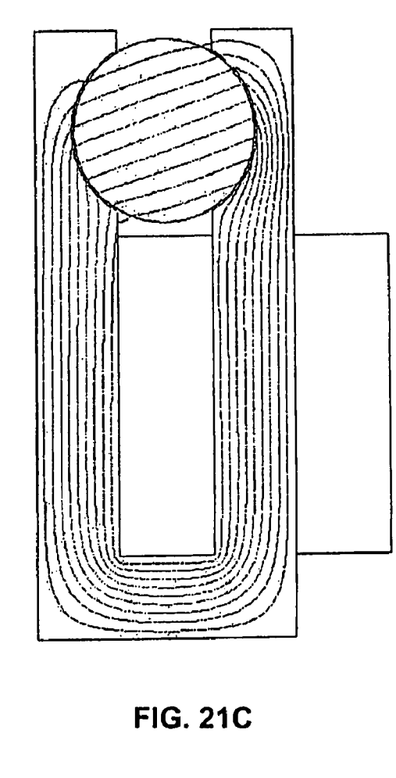

The magnetic core 50 of a rotating electrical machine 20 is conventionally produced of isotropic steel with non-oriented grain. However, in an electrical machine with a U-shaped core, as described herein, the magnetic flux lines in the lamination 90 are substantially parallel with the inner surface 104 and outer surface 105 (see FIGS. 21A, 21B, and 21C). Therefore by employing anisotropic grain-oriented steel, which is commonly used for transformers, and orienting the legs 96 and 97 along the preferred magnetization (or the "easy" rolling) direction of the steel, the magnetic circuit reluctance and the iron losses are decreased and the motor efficiency and/or specific power increased.

The lamination 90 (FIG. 6) also includes fastening slots (also referred to as recesses) 112. The slots 112 in FIG. 6 coincide with the tabs 80, 81, 82, and 83 in FIG. 5. The location, number, and shape (e.g., square, triangular, arcuate, polygonal, etc.) of the slots 112 can vary. In some constructions, the shape, size, and location of slots 112 are such as to minimize the distortion of the magnetic flux lines in the core 50 and therefore provide good motor performance.

A fastener is used to join together the laminations into a stack of laminations. For example, FIGS. 3 and 4 show one construction of a fastener including bolts and nuts 113. Openings 114 (FIGS. 1 and 2) are disposed along the base portion of the core 50 to receive the bolts. The number, type (e.g., adhesive, screw, rivet, weld, etc.), and position of the fasteners on the core 50 can vary.

Figure 7:
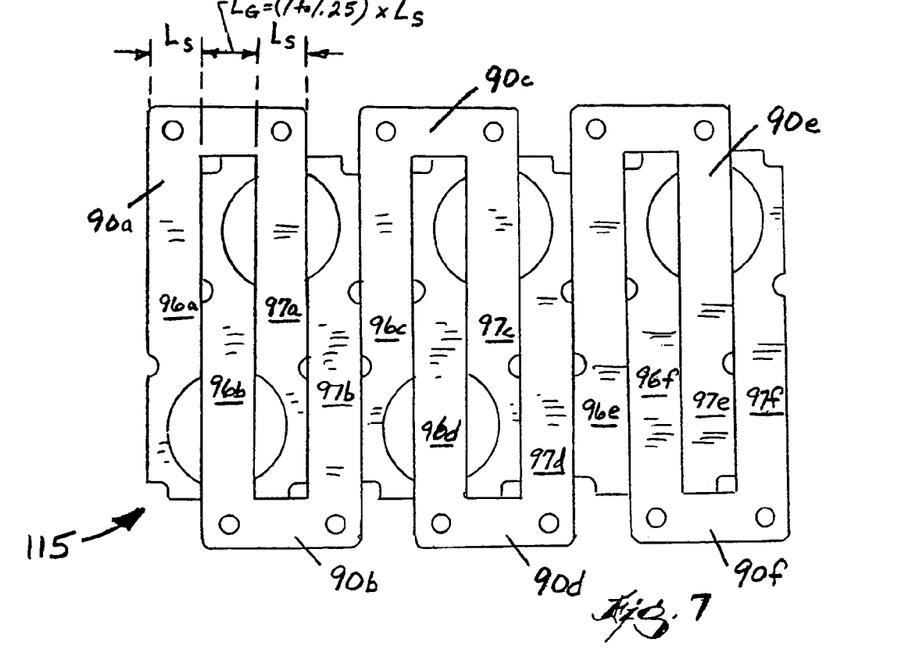
FIG. 7 is a plan view of one construction of a pattern for providing the U-shaped laminations of the stator core used in the electrical machine of FIG. 4.

FIG. 7 shows a first pattern 115 for producing a plurality of laminations 90 used in the stator core 50. The first pattern 115 includes a plurality of U-shaped laminations 90a-f having first 96a-f and second 97a-f legs with a width ($L_S$) and separated by a gap distance ($L_G$). The gap distance ($L_G$) separating the first 96a-f and second 97a-f legs ranges between ($L_G$=(1 to 1.25)×($L_S$)). The first U-shaped lamination 90a is disposed with the free ends of the first 96a and second 97a legs directed in a first direction. A second U-shaped lamination 90b is rotated one hundred eighty degrees with respect to the first U-shaped lamination 90a. Leg 96a of the first U-shaped lamination 90a is disposed adjacent to leg 96b of the second U-shaped lamination 90b. Leg 97a of the first U-shaped lamination 90a is disposed between the legs 96b and 97b. The pattern 115 also includes a third U-shaped lamination 90c rotated one hundred eighty degrees with respect to the second U-shaped lamination 90b. The third U-shaped lamination 90c includes a leg 96c disposed adjacent to the leg 97b of the second U-shaped lamination 90b. A fourth U-shaped lamination 90d includes a leg 96d disposed between the legs 96c and 97c of the third U-shaped lamination 90c, similar to the arrangement of the first 90a and second 90b U-shaped laminations described above. Likewise, U-shaped lamination 90e having legs 96e and 97e and U-shaped lamination 90f having legs 96f and 97f are disposed similar to the arrangement of laminations 90a and 90b described above. The pattern 115 can contain any number of U-shaped laminations 90.

A second construction of the pattern 115 (FIG. 7) can include the third and fourth U-shaped laminations 90c and 90d rotated one hundred eighty degrees with respect to the first and second U-shaped laminations 90a and 90b. Leg 96d of the fourth U-shaped lamination 90d is disposed between the first 96c and second 97c legs of the third U-shaped lamination 90c. Therefore, the orientation of a coinciding pair of laminations (e.g., 90a and 90b, 90c and 90d, and 90e or 90f) can vary with respect to the other pairs of laminations.

Figure 8:
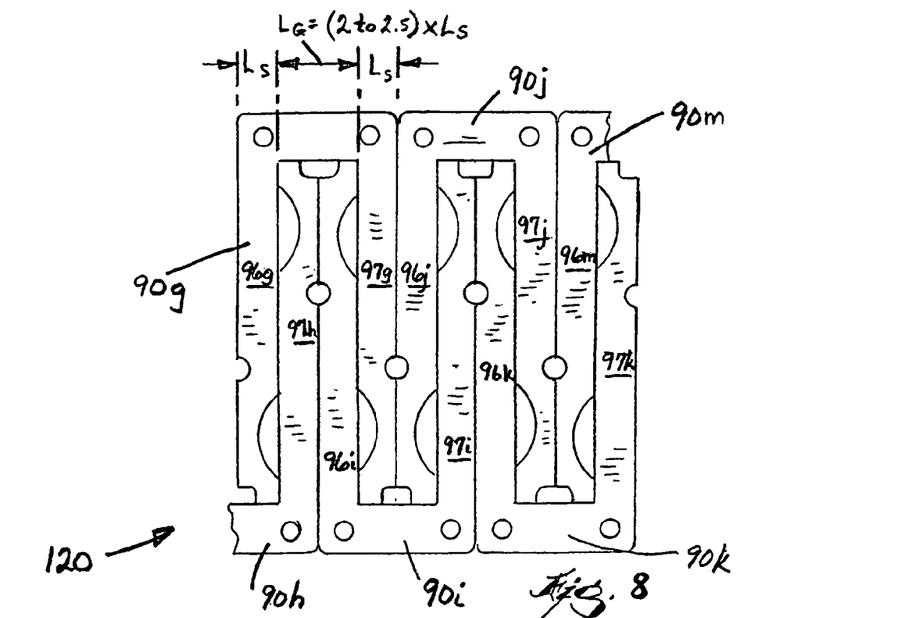
FIG. 8 is a plan view of a second construction of a pattern for providing the U-shaped laminations of the stator core used in the electrical machine of FIG. 4.

FIG. 8 shows a second pattern 120 for producing a plurality of laminations 90 used in the stator core 50. The second pattern includes a second construction of U-shaped laminations 90g-l. The U-shaped laminations 90g-l include first legs 96g-l and second legs 97g-l, respectively. The legs 96g-l and 97g-l have a width ($L_S$). The legs 96g-l and 97g-l are separated by a gap distance ($L_G$) ranging from (($L_G$)=(2 to 2.5)× ($L_S$)).

The pattern 120 includes a first U-shaped lamination 90g having legs 96g and 97g. The lamination 90g is disposed adjacent to a second U-shaped lamination 90j having legs 96j and 97j. A third U-shaped lamination 90h (partially shown) and a fourth U-shaped lamination 90i are rotated one hundred-eighty degrees relative the first and second U-shaped laminations 90g and 90j. Leg 97h of U-shaped lamination 90h is disposed adjacent to leg 96i of U-shaped lamination 90i, and legs 97h and 96i are disposed between legs 96g and 97g of U-shaped lamination 90g. Leg 97g of U-shaped lamination 90g and leg 96j of U-shaped lamination 90j are disposed between legs 96i and 97i of the U-shaped lamination 90i. The pattern also includes a U-shaped lamination 90k having legs 96k and 97k rotated one hundred-eighty degrees with respect to lamination 90j. Leg 97i of U-shaped lamination 90i is disposed adjacent to leg 96k of U-shaped lamination 90k, and legs 97i and 96k are disposed between legs 96j and 97j of U-shaped lamination 90j. A sixth U-shaped lamination 90m (partially shown) having a leg 96m is rotated one hundred-eighty degrees with respect to lamination 90k. Leg 97j of U-shaped lamination 90j is disposed adjacent to leg 96m of U-shaped lamination 90m, and legs 97j and 96m are disposed between legs 96k and 97k of U-shaped lamination 90k. The pattern 120 can contain any number of U-shaped laminations.

The above constructions of the patterns 115 and 120 minimize the scrap of material and therefore reduce material costs for the manufacture of the laminations 90. Other patterns can be used to provide the laminations 90 of the core 50. One method of removing the U-shaped laminations 90 from planar sheets of electric steel is by a stamping process. Stamping can include punching the plurality of U-shaped laminations 90 from a planar sheet using a machine or die designed with the patterns 115 and 120 described above in FIGS. 7 and 8, respectively. Other patterns and methods of providing the laminations 90 and/or the stator core 50 can be used.

Electrical machines, particularly single-phase, two-pole brushless motors, generally encounter problems with cogging and ripple torque, which can cause noise, and vibration that negatively effects motor performance. Ripple torque is characterized as a cyclical variation in a delivered torque to a load caused by the interaction of the rotor magnetic field with harmonics in the stator current magnetomotive forces (mmf's). Cogging torque describes the non-uniform torque as a result of the interaction of the rotor magnetization and angular variations in the air gap permeance (or reluctance) associated with the shape of the stator core 50 and rotor 30. For a motor 20 with a generally U-shaped stator core 50 as described above, the air-gap permeance is higher at an angular position where the rotor 30 faces a recess 110 as compared with the air-gap permeance at an angular position where the rotor 30 faces the free space in between the first 96 and second 97 legs of the core 50 (see FIG. 6). There is a demand for an electrical machine that minimizes the effect of cogging and ripple torque and that exhibits smoother operation.

Figure 9:
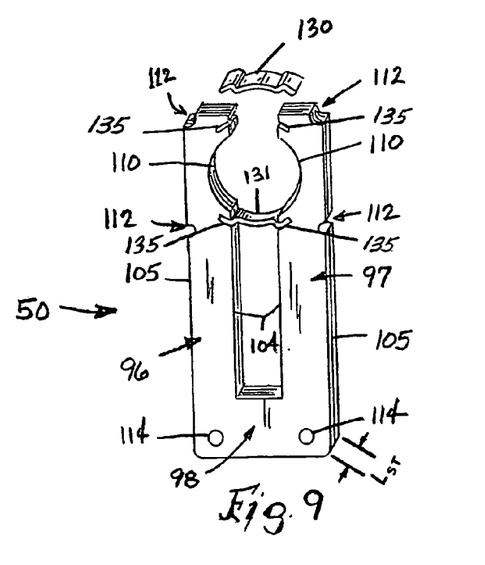
FIG. 9 is a perspective view of one construction of a plurality of bridges and a stator core used in the electrical machine of FIG. 4.

FIG. 9 shows one construction of the electrical machine of the invention that includes a pair of bridges 130 and 131 inserted between the first 96 and second 97 legs of the core 50. The material used for the bridges 130 and 131 can be selected and the shape and dimensions of the bridges 130 and 131 can be designed as to reduce the variation in the air-gap permeance and related variance in the magnetic permeance around the circumference of the rotor 30 and therefore reduce cogging torque, noise and vibration of the electrical machine 20. Also the material used for the bridges 130 and 131 can be selected and the shape and dimensions of the bridges 130 and 131 can be designed as to improve other aspects of motor performance. For example and in one construction, the material characteristics and the design of bridges influence the parking position of the rotor 30, and therefore, improve the starting capability of the electrical machine 20.

Figure 20:
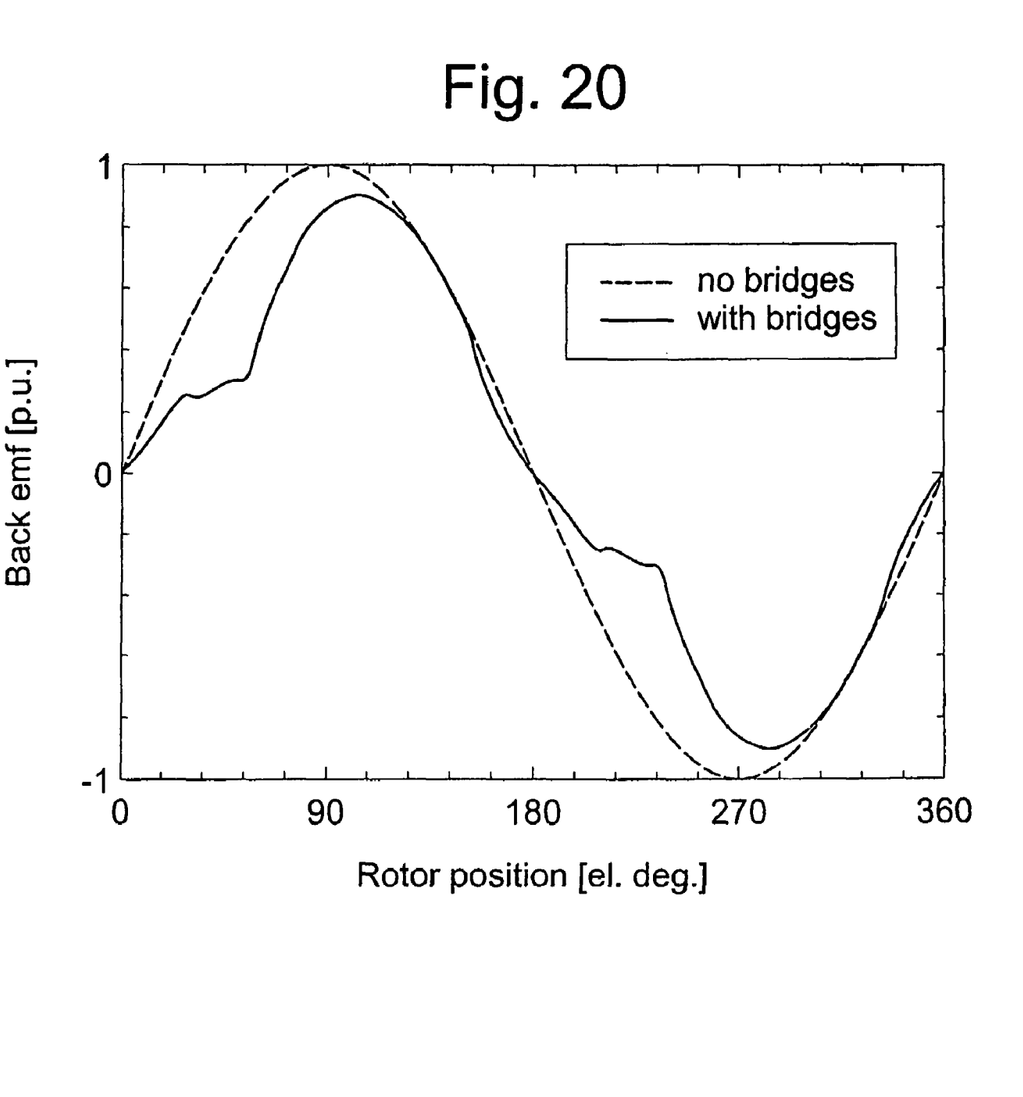
FIG. 20 is a graph showing the back electromotive force of a representative single-phase brushless permanent magnet electrical machine with a U-shaped stator core with and without magnetic bridges.

In another example construction, the material characteristics and the design of bridges influence the rotor leakage flux, the stator coil flux linkage, and the electrical machine back emf. In a single-phase electrical machine 20 with a U-shaped stator core 50 and without any bridges the back emf waveform is substantially sinusoidal (see the dotted curve from FIG. 20). In a single-phase electrical machine 20 having a U-shaped stator core 50 and including bridges inserted in between the legs of the stator core, the back emf waveform is substantially non-sinusoidal (see the continuous curve from FIG. 20). A step (plateau) in the raise of the back emf between 0 and 90 electrical degrees is beneficial in allowing the winding current to build up under the influence of the difference between the applied voltage and the back emf. As a consequence, the specific torque output and/or the motor efficiency are increased. In yet another construction, the use of the bridges modifies the motor magnetic field allowing a Hall sensor to be placed at a position that enables the phase advance of the armature current, resulting in a modification of the electric current waveform and in a reduction of torque ripple and/or increase of the specific torque output and/or increase of motor efficiency.

FIG. 9 shows slots 135 disposed along the inner surfaces 104 of the core 50. The slots 135 receive the bridges 130 and 131, and are disposed to accommodate operation of the rotor 30 and the size of the at least one stator coil 55 (see FIG. 3). Yet, the disposition of the slots 135 along the inner surfaces 104 of the first and second legs 96 and 97 can vary. The shape (e.g., slits, polygonal, elliptical, circular, arcuate, etc.) and size of the slots 135 can vary to receive the bridges 130 and 131. In some constructions, the bridges 130 and 131 are identical. The slots 135 can be angled with respect to the inner faces 104 of the legs 96 and 97 to reduce vibration of the bridges and of the electrical machine. The following includes a description of various constructions of the bridges.

Figure 10:
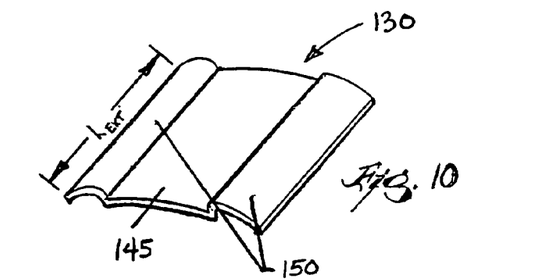
FIG. 10 is a perspective view of the bridge shown in FIG. 9.

FIGS. 9 and 10 show one construction of a bridge 130 comprised of a lamination of magnetic material. The bridge 130 includes a central portion 145 between a pair of tabs 150. The tabs 150 are disposed upward and outward with respect to the central portion 145. The tabs 150 are compatible with the slots 135 of the first and second legs of the core 50. This shape and mounting of the bridge 130 provide good mechanical strength to the electromagnetic forces. A length ($L_{EXT}$) of the tabs 150 includes the portion of the bridge 130 inserted in the slots 135. Typically, the length ($L_{EXT}$) of the tabs 150 substantially equals the stack length ($L_{ST}$) of the core 50 (see FIG. 9) to minimize magnetic field distortion. The size and dimension of the bridge 130 and respective slots 135 relates to the movement or vibration caused by the electromagnetic forces. Another construction of the bridge 130 can include ribs to reduce vibration. The bridge 130 can be pressed fitted into the core 50. In another construction the bridge 130 can be fastened to the core 50 by various means such as, but not limited to, adhesive, injected molded plastic etc.

Figure 11:
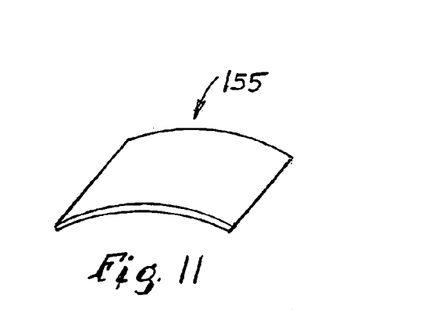
FIG. 11 is a perspective view of another construction of a bridge capable of being used with the electrical machine of FIG. 1.

As shown in FIGS. 9 and 10, the central portion 145 includes an arcuate shaped surface that reduces variation in the air gap between the slots 110 of the first and second legs 96 and 97. The shape and size of the central portion 145 can vary. Another construction of the bridge 130 can include a stack of multiple laminations of magnetic material having the shape as shown in FIG. 10. The laminations can be coupled by various fastening means (e.g., adhesive, mechanically-pressed, injection molded plastic, etc.) to produce a stack. FIG. 11 shows a bridge 155 that includes a uniformly arcuate-shaped lamination from end-to-end.

Figure 12:
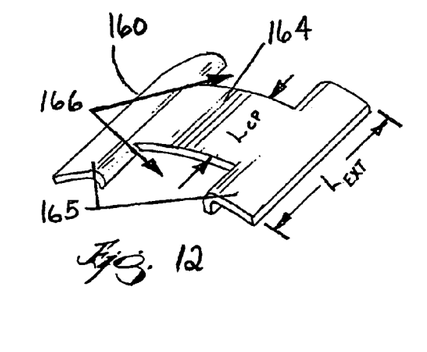
FIG. 12 is a perspective view of yet another construction of a bridge capable of being used with the electrical machine of FIG. 1.
Figure 13:
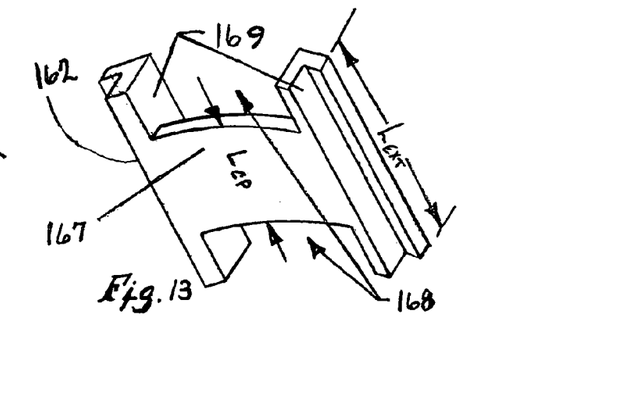
FIG. 13 is a perspective view of even yet another construction of a bridge capable of being used with the electrical machine of FIG. 1.

FIGS. 12 and 13 show constructions of a bridge 160 and 162, respectively, having a shorter central portion 164 and 167 with respect to tabs 165 and 169, respectively. The central portion 164 includes one or more central cutouts 166. The length, width, and shape (e.g., triangle, square, polygonal, arcuate, etc.) of the central cutouts 166 can vary. The central portion 164 has a central portion length ($L_{CP}$) that is less than or equal to the tab length ($L_{EXT}$) and less than the stack length ($L_{ST}$) of the core 50 (see FIG. 9). In such a construction, the magnetic flux is axially concentrated through the central portion 164 of the bridge 160 therefore increasing the values of the magnetic flux density and causing magnetic saturation. The length ($L_{CP}$) of the central portion 165 with respect to the length ($L_{EXT}$) of the tabs 167 and stack length ($L_{ST}$) of the core 50 influences the operating values of the magnetic flux density in the bridges and the equivalent air-gap permeance and therefore can be designed to improve motor performance. The space available in the cutouts 166 can be conveniently used to place a Hall sensor. FIG. 13 shows a bridge 162 including a central portion 167 with cutouts 168. The central portion 167 is offset with respect to tabs 169.

FIGS. 14-17 show other constructions of bridges 170, 190, and 200. The shape and construction of the bridges 170, 190, and 200 enhances the ability to vary the dimensions of the bridges 170, 190, and 200 and therefore to modify the equivalent air-gap permeance and improve motor performance. The bridges 170, 190 and 200 can be produced, for example, as a stack of electric steel laminations or can be made out of compressed powdered magnetic material.

Figures 14, 15, 16, 17:
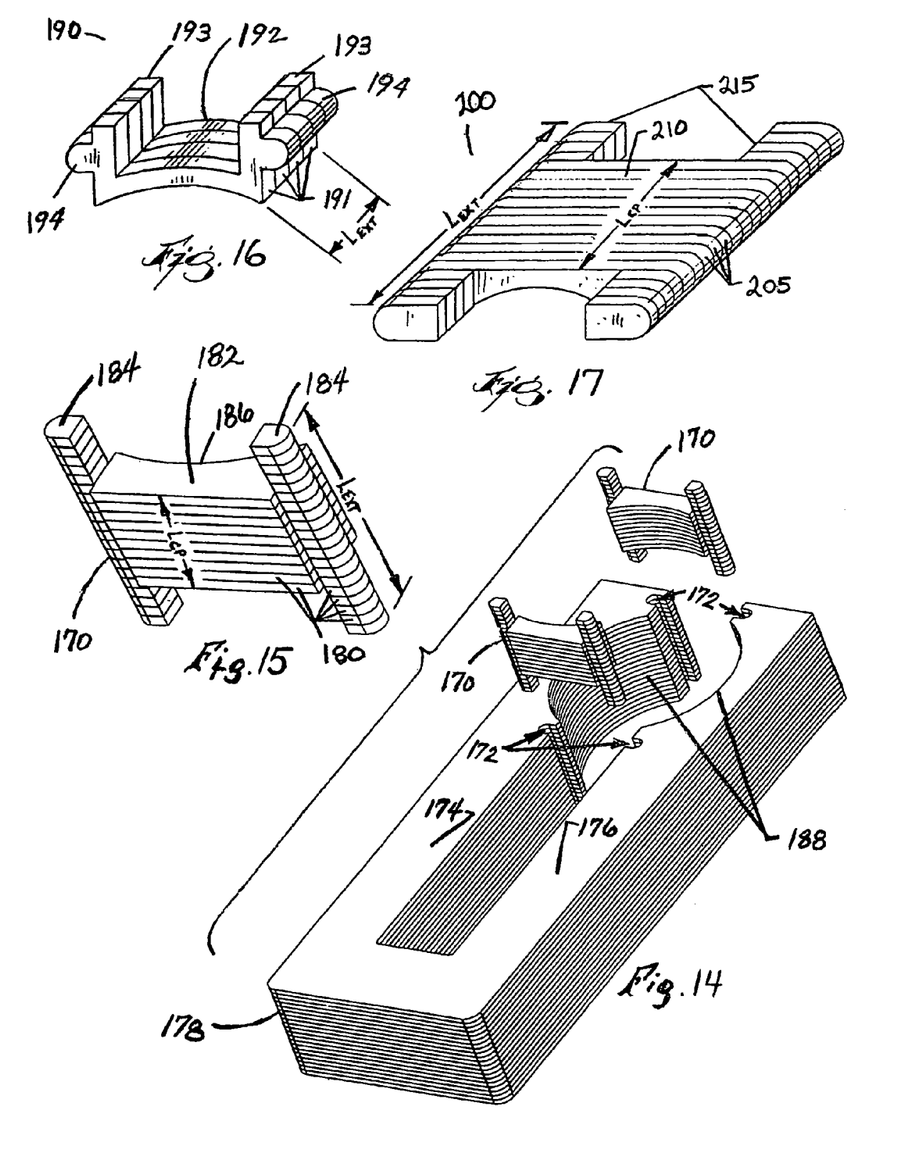
FIG. 14 is a partial exploded view of another construction of a plurality of bridges and a generally U-shaped stator core.
FIG. 15 is a perspective view of another construction of a bridge capable of being used with the U-shaped stator core of FIG. 14.
FIG. 16 is a perspective view of yet another construction of a bridge capable of being used with the U-shaped stator core of FIG. 14.
FIG. 17 is a perspective view of even yet another construction of a bridge capable of being used with the U-shaped stator core of FIG. 14.

FIG. 14 shows a partial exploded view of one construction of bridges 170 and 171 that insert in slots 172. FIG. 15 shows a perspective view of the bridge 170. The bridge 170 includes a stack of laminations 180 of magnetic material that can be coupled using various means (e.g., adhesives, interlocking, etc.). The bridge 170 includes a central portion 182 between a pair of tabs 184. The central portion 182 includes an arcuate-shaped surface 186 that faces the rotor 30. The arcuate-shaped surface 186 provides a transition between slots 188 along the first and second legs 174 and 176 (see FIG. 14). The shape (e.g., linear, curvilinear, stepped, etc.) of the central portion 182 can vary and is designed such as to modify the equivalent air-gap permeance and improve motor performance. The tabs 184 are also arcuate-shaped and are inserted in the respective slots 172 of the first and second legs 174 and 176 (see FIG. 13). The shape (e.g., arcuate, square, polygonal, etc.) of the tabs 184 and respective slots 172 can vary.

FIG. 16 shows the bridge 190 comprised of laminations 191. The bridge 190 includes a central portion 192 coupled between a pair of tabs 193. The central portion 192 is arcuate shaped, and the tabs 193 are disposed adjacent to the first 174 and second 176 legs of the core 178. Each tab 193 includes a protrusion 194 having an arcuate-shape, similar to the tabs 184 in FIG. 14, to insert in the slots 172 of the core 178. Other shapes of the tabs, protrusions and slots into the core are also possible.

FIG. 17 shows the bridge 200 having laminations 205. The bridge includes a central portion 210 having a length ($L_{CP}$) less than the length ($L_{EXT}$) of tabs 215.

Figure 18:
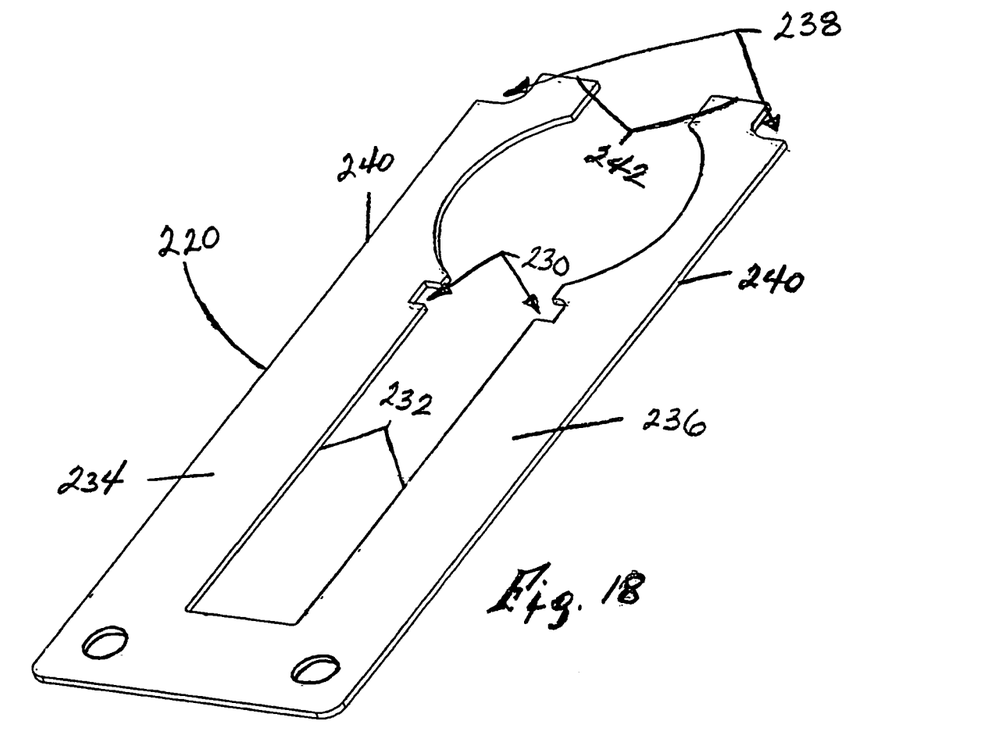
FIG. 18 is a perspective view of another construction of a lamination of a U-shaped stator core capable of being used with the electrical machine of FIG. 3.
Figure 19:
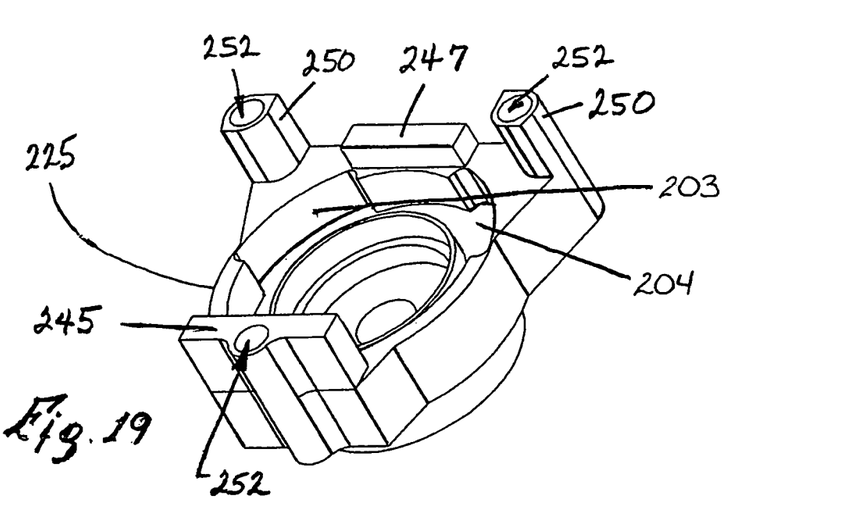
FIG. 19 is a perspective view of an endcap capable of being used with a stator including the laminations of FIG. 18.

FIG. 18 shows another construction of a stator core lamination 220. The lamination 220 includes a pair of rectangular-shaped bridge slots 230 disposed along the inner surfaces 232 of the first 234 and second 236 legs. The lamination 220 also includes a pair of fastening slots 238 disposed along outer surfaces 240 at free ends 242 of the first and second legs 232 and 234. FIG. 19 shows a construction of the endcap 225 of the housing 25 used with lamination 220. First and second bridges 245 and 247 are coupled to the endcap 225. The first bridge 245 inserts in the slots 230 of the core lamination 220 (see FIG. 18). The second bridge 247 inserts between the free ends 242 of the first 234 and second 236 legs (see FIG. 18). The endcap 225 also includes a pair of fastening tabs 250 that insert in the fastening slots 238. The first bridge 245 and each of the fastening tabs 250 includes fastening openings 252 to receive a fastening means. The endcap 225 couples by fastening means to a second endcap similar to the housing 25 described above in FIGS. 1-4. This construction of the lamination 220, endcap 225, and bridges 245 and 247 simplifies the process of assembling the motor 20.

The exploded view from FIG. 1 illustrates the preferred method of assembling an electrical machine with a U-shaped magnetic circuit as described by the invention. A core 50 is produced by stamping laminations of electric steel and fastening them to produce a stack. Coils 57 and 59 are produced by winding copper wire with a bobbin winder. At least one coil is inserted on one leg of the core 50. The non-drive end-cap 65 and the bridges 130 and 131 are attached to the core 50. The rotor 30 is inserted in between the legs of the core 50 so that the non-drive end of the shaft 35 is coupled to the non-drive end-cap 65. The drive end-cap 60 is coupled to the core 50 and the shaft 35 and fastened to the end-cap 65 through the openings 78 and 79.

Thus, the invention provides, among other things, a brushless electrical machine with a U-shaped magnetic circuit and a method of manufacturing the same. Various features and advantages of the invention are set forth in the following claims.

What is claimed is:

1. A method of manufacturing a core for an electrical machine, the method comprising the acts of:
   providing a planar sheet of magnetic material comprising anisotropic grain-oriented steel having a preferred magnetization direction;
   creating first and second generally U-shaped laminations from the planar sheet, the first and second generally U-shaped laminations resulting from a pattern formed in the planar sheet, the pattern including
      the first generally U-shaped lamination having a first leg and a second leg, the first leg having a length and the second leg having the length, the length of the first leg and the length of the second leg being oriented along the preferred magnetization direction,
      the second generally U-shaped lamination rotated one hundred-eighty degrees with respect to the first generally U-shaped lamination, the second generally U-shaped lamination including a third leg and a fourth leg, the third leg having the length and the fourth leg having the length, the length of the third leg and the length of the fourth leg being oriented along the preferred magnetization direction, the third leg being disposed between the first and second legs,
      the first, second, third, and fourth legs having first, second, third, and fourth inner surfaces, respectively, having first, second, third, and fourth arcuate-shaped recesses, respectively, for receiving a rotor, and
      the first, second, third, and fourth inner surfaces further having first, second, third, and fourth slots, respectively; and
   creating the core including stacking the first and second generally U-shaped laminations and inserting a bridge in the first, second, third, and fourth slots, the bridge comprising magnetic material.

2. The method of claim 1 wherein the method further comprises creating third and fourth generally U-shaped laminations from the planar sheet, wherein the third and fourth generally U-shaped laminations further result from the pattern formed in the planar sheet, and wherein the pattern formed in the planar sheet further includes
   the third generally U-shaped lamination being disposed adjacent to the second generally U-shaped lamination, the third generally U-shaped lamination being rotated one hundred-eighty degrees with respect to the second generally U-shaped lamination, the third generally U-shaped lamination including a fifth leg and a sixth leg, and
   the fourth generally U-shaped shaped lamination being rotated one hundred-eighty degrees with respect to the third generally U-shaped lamination, the fourth generally U-shaped lamination including a seventh leg and an eight leg, the seventh leg being disposed between the fifth and sixth legs.

3. The method of claim 1 wherein the first leg defines a width ($L_S$) and the second leg defines the width ($L_S$), wherein the first and second legs define a distance ($L_G$) between the first and second legs, and wherein the width ($L_S$) and the distance ($L_G$) satisfies the relationship ($L_S \leq L_G \leq 1.25(L_S)$).

4. The method of claim 1 wherein the method further comprises creating a third generally U-shaped lamination from the planar sheet, wherein the third generally U-shaped lamination further results from the pattern formed in the planar sheet, wherein the pattern formed in the planar sheet further includes the third generally U-shaped lamination being rotated one hundred-eighty degrees with respect to the first generally U-shaped lamination, the third generally U-shaped lamination including a fifth leg and a sixth leg, and wherein the fifth leg is disposed adjacent to the third leg of the second generally U-shaped lamination and between the first and second legs of the first generally U-shaped lamination.

5. The method of claim 4 wherein the first leg defines a width ($L_S$) and the second leg defines the width ($L_S$), wherein the first and second legs define a distance ($L_G$) between the first and second legs, and wherein the width ($L_S$) and the distance ($L_G$) satisfies the relationship ($2(L_S) \leq L_G \leq 2.5(L_S)$).

6. The method of claim 1 wherein the creating act includes stamping the planar sheet with a die having the pattern.

7. The method of claim 1 wherein the bridge comprises a sheet of magnetic material that includes an arcuate portion.

8. The method of claim 7 wherein the magnetic material of the bridge includes isotropic steel.

9. The method of claim 7 wherein the magnetic material of the bridge includes anisotropic steel.

10. The method of claim 1 wherein the pattern further includes the first, second, third, and fourth recesses being tapered.

11. The method of claim 1 wherein the pattern further includes the first, second, third, and fourth legs having fifth, sixth, seventh, and eighth slots, respectively, and wherein creating the core further comprises inserting a second bridge in the fifth, sixth, seventh, and eighth slots, the second bridge comprising magnetic material.

12. The electrical machine of claim 1 wherein the pattern further includes the first, second, third, and fourth legs having first, second, third, and fourth outer surfaces, and wherein the pattern further includes the first, second, third, and fourth outer surfaces having first, second, third, and fourth recesses for receiving a portion of a housing.

* * * * *